No. 673,835. Patented May 7, 1901.
F. FRANZL & V. JIROUTEK.
MALT TURNING APPARATUS.
(Application filed Jan. 16, 1900.)
(No Model.) 2 Sheets—Sheet 1.
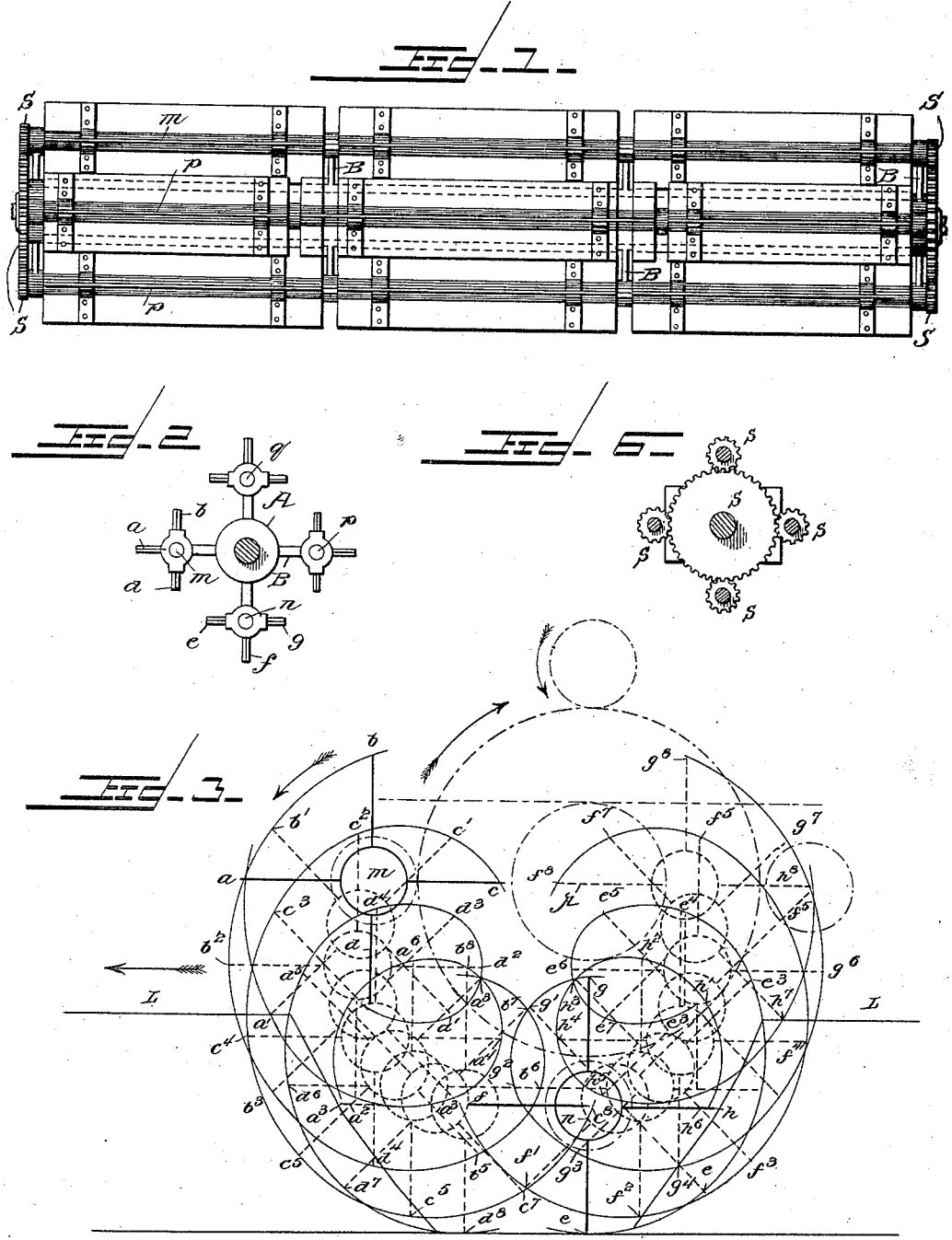
Witnesses
Florence Hieser.
R. P. Herrick.
Inventors
Francis Franzl
and Václav Jiroutek
by W. H. Babcock
Attorney No. 673,835. Patented May 7, 1901.
F. FRANZL & V. JIROUTEK.
MALT TURNING APPARATUS.
(Application filed Jan. 16, 1900.)
(No Model.) 2 Sheets—Sheet 2.
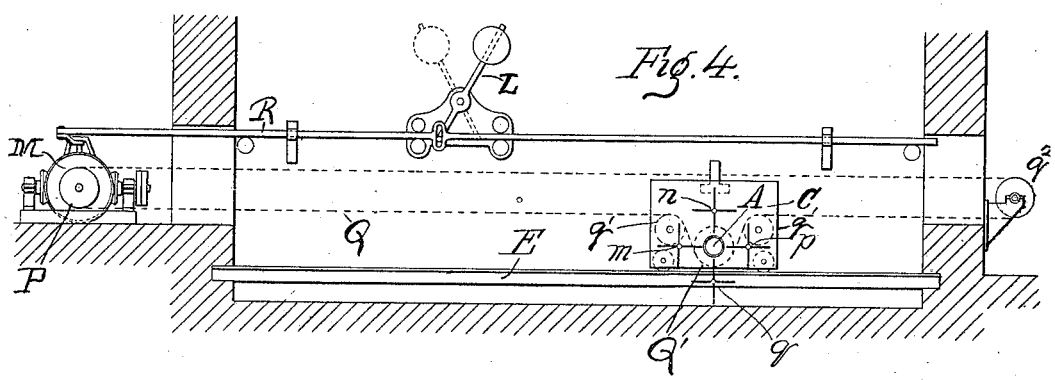
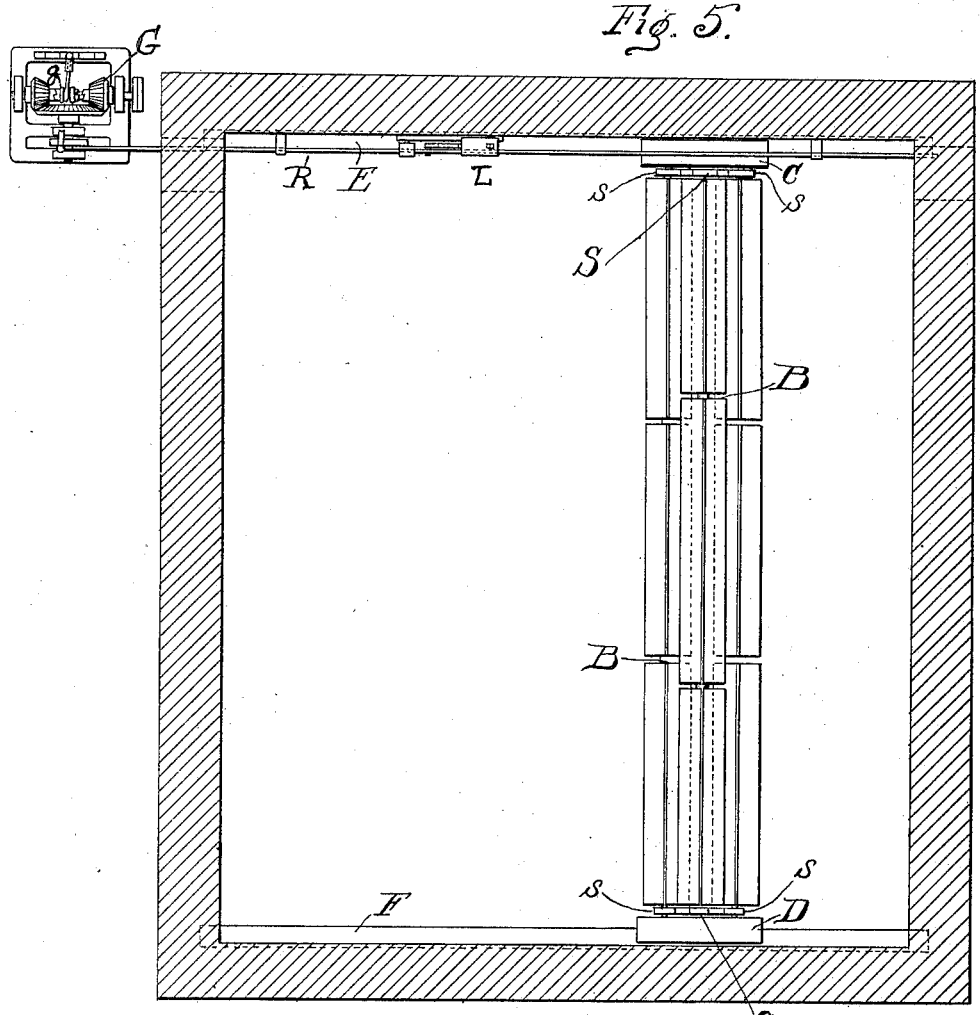

UNITED STATES PATENT OFFICE.

FRANCIS FRANZL AND VÁCLAV JIROUTEK, OF ROUDNICE, AUSTRIA-HUNGARY.

MALT-TURNING APPARATUS.

SPECIFICATION forming part of Letters Patent No. 673,835, dated May 7, 1901.

Application filed January 16, 1900. Serial No. 1,626. (No model.)

*To all whom it may concern:*

Be it known that we, FRANCIS FRANZL and VÁCLAV JIROUTEK, residing in Roudnice, in the Kingdom of Bohemia, Empire of Austria-Hungary, have invented a new and useful Malt-Turning Apparatus, of which the following is a specification.

The machine consists in the combination of rotary shovels fixed on horizontal spindles around a central spindle, forming a complete epicyclic train. Like other machines of the kind, this machine covers the whole width of the malting-floor and moves from one end of it to the other reciprocatingly. At each end it is provided with a wheeled carriage running upon two horizontal rails on the floor. There is a toothed wheel fixed to the carriage concentric with the central spindle. To each secondary spindle there is a toothed wheel fixed, which is geared to the said toothed wheel upon the carriage. The central spindle is turned by the movement of the machine on the rails, the secondary spindles turning with the central spindle around the central axis and each independently turning around its own axis also, carrying the shovels with them in this double rotary movement. The direction of such rotation changes with the direction of travel of the machine. During such rotation the shovels descend successively into the layers of malt or barley upon the floor by degrees and not through its whole depth, dividing it in several sublayers and spreading one after the other. It is well known that such a layer during the process of malting or a similar process is by no means of a homogeneous character as to the degree of its development, dryness, and temperature. It is therefore not sufficient to take up such a layer and simply turn it over. On the contrary, the malt of the several layers must be mixed thoroughly, so as to keep it in uniform condition continually during such process. By our machine such work is performed thoroughly and better than with the hands of skilful workmen.

In the accompanying drawings, Figure 1 is a plan view of the machine. Fig. 2 is an end elevation of the shafts, radial arms, and shovels. Fig. 3 is an end elevation of the gearing at right angles to Fig. 1, showing one of the main gear-wheels S mounted on its carriage. Fig. 4 is a diagram showing the combined movements of the shovels and their manner of action. Figs. 5 and 6 show all the mechanism coöperating with the machine in a vertical and a horizontal view, respectively, the walls and floor being shown in section.

Similar letters refer to similar parts throughout the several views.

A, Fig. 4, designates the main shaft of the machine, extending across the floor and journaled in bearings on carriages C D, which run forward and backward alternately on rails E F. This movement with reversal of direction at the ends of the rails may be effected by any suitable mechanism. As the latter forms no part of my invention I have deemed it sufficient to indicate the same in a general way in Figs. 4 and 5, where M designates the motor; L, the reversing hand-lever; R, its rod; G, the reversing bevel-gearing operated thereby through the medium of a clutch $g$; P, the driving-pulley on the shaft of the motor; Q, the belt passing around the same; $q^2$, another pulley in stationary bearings at the other end of the said belt; $q'\ q'$, guide-pulleys for said belt on carriage C, and Q' an intermediate pulley on the main or central shaft A, around which latter pulley the said belt passes. The shaft is rotated by the action of the said belt on the latter pulley in one direction or the other, according to the direction of rotation of the motor-shaft and the consequent direction of travel of the driving-belt Q, the same being reversed by hand at regular intervals, as before stated. Of course the said belt also pulls the carriage C alternately backward and forward along the rails as thus governed, and the main shaft A causes the carriage D at the other end thereof to travel likewise.

The main or central shaft A carries a number of radial arms B, which are fast thereon and of course turn therewith. At equal distances from said shaft the said arms afford bearings for secondary parallel shafts $m\ n\ p\ q$, the number of which may vary according to convenience. Each of these secondary shafts carries at each end a pinion $s'$, Fig. 5, and each carriage C or D is provided with a fixed gear-wheel or pinion S, meshing with the surrounding pinions S' at that end of the said shafts. These pinions or wheels S are concentric with the main shaft, but independent thereof, so that they do not prevent its turning. Their function is to give independent rotation through pinions $s'$ to the secondary shafts, besides the revolution of the latter as a series or system about the axis of the main shaft A. This double motion, which is roughly analogous to that of the planets on their individual axes and around the sun, although in the machine there is but one orbit, which is circular, causes the shovels which are mounted on said secondary shafts to travel in an epicyclical path, acting successively upon the malt, as indicated by diagram in Fig. 4. For greater simplicity this diagram is restricted to the action of two secondary shafts and their sets of shovels.

The secondary shaft $m$ carries the four shovels $a\ b\ c\ d$, fixed to it. The secondary shaft $n$ carries the four shovels $e\ f\ g\ h$, fixed to it.

F is the floor, from which the layer to be turned reaches to the level L.

The machine is supposed to move from right to left and the system turns contrary to the dial's direction, as shown by the arrows. Shaft $m$ is indicated as descending and in position for its shovels to begin striking into the layer of malt. Shaft $n$, with its shovels, occupies the deepest position and begins to ascend. Seven successive descending positions of shaft $m$ are indicated in this diagram by dotted lines and seven ascending successive positions of shaft $n$ are also indicated in the same way. The path described by the end of each shovel is shown by a full-line curve. The curve $b\ b'\ b^2\ b^3\ b^4\ b^5\ b^6\ b^7\ b^8$, for instance, is the path of the point $b$, then follows the path of the point $c$, and so on. It will be easy to follow the action of each shovel.

It will be seen that the shovels collectively dig to the bottom of the layer of malt, but that shovel $a$ attacks only the upper part of the layer, leaving a lower part to the shovel $b$, and thus a still lower one to the following shovel $c$. The lowest part of the layer is attacked by the shovel $d$, which touches the floor F; but in the meantime each successive shovel has mixed with the part which it primarily acts on the part or parts lowered by its predecessor or predecessors. The ascending shovels attack the layer systematically step by step, each one passing its part over to the other and the following one mixing at the same time the part acted on by the said preceding shovel very thoroughly with the part of the layer which it primarily acts on. In this way not only every particle which has been near the floor is transferred to the upper part of the layer, and vice versa, but every part of the layer is also mixed through and through continually and systematically, so that there must be in every part of the layer the same degree of moisture, the same degree of temperature, and the same degree of chemical or physiological development. On its return the machine changes in direction and the shovels also, but the process remains the same.

We are aware that several systems of rotary shovels have been invented to replace the shoveling with hands. We therefore do not claim such a combination broadly, neither do we claim such a machine with alternative movement upon the floor; but What we do claim as our invention, and desire to secure by Letters Patent, is—

In reciprocating shoveling-machines for malt and like materials, the combination of a set of shovels and the secondary horizontal epicyclic spindles on which they are mounted, of radial arms in which said spindles are journaled, a central horizontal shaft on which the said arms are radially fixed, means for rotating the said central shaft as the machine travels backward and forward, and gearing whereby such travel is caused to rotate the said auxiliary spindles individually on their own axes and also to make them revolve collectively about the axis of the central shaft, in order that the shovels may successively and systematically act on successive sublayers of the material, substantially as set forth.

In witness whereof we have hereunto set our hands in presence of two witnesses.

FRANCIS FRANZL.
VÁCLAV JIROUTEK.

Witnesses:
KAREL KATTMEYER,
ADOLPH FISCHER.